United States Patent [19]
Hoffman

[11] Patent Number: 6,071,380
[45] Date of Patent: *Jun. 6, 2000

[54] METHOD OF PAPERMAKING HAVING ZERO LIQUID DISCHARGE

[75] Inventor: Roger P. Hoffman, Green Bay, Wis.

[73] Assignee: Hoffman Environmental Systems, Inc., Green Bay, Wis.

[*] Notice: This patent is subject to a terminal disclaimer.

[21] Appl. No.: 09/037,250

[22] Filed: Mar. 9, 1998

Related U.S. Application Data

[63] Continuation-in-part of application No. 08/654,248, May 28, 1996, Pat. No. 5,762,758, which is a continuation of application No. 08/298,748, Aug. 31, 1994, abandoned.

[51] Int. Cl.$^7$ .................. D21F 1/66; D21C 9/02; D21C 1/70

[52] U.S. Cl. .................. 162/190; 162/55; 162/29; 162/60; 162/47; 162/44; 159/47.3; 210/650; 210/652

[58] Field of Search ..................... 162/190, 264, 162/55, 29, 47, 30.1, 30.11, 60, 43, 44, 290, 189; 159/47.3; 210/650, 651, 652

[56] References Cited

U.S. PATENT DOCUMENTS

| | | |
|---|---|---|
| 2,771,823 | 11/1956 | Lukemire . |
| 3,467,573 | 9/1969 | Vogel . |
| 3,884,755 | 5/1975 | Frost, III . |
| 3,988,200 | 10/1976 | Smith, Jr. . |
| 3,988,201 | 10/1976 | Smith, Jr. . |
| 4,115,188 | 9/1978 | O'Brien et al. . |
| 4,574,032 | 3/1986 | Ringley . |
| 5,302,246 | 4/1994 | Nykanen et al. . |
| 5,380,402 | 1/1995 | Ryham et al. . |
| 5,449,437 | 9/1995 | Vikio .................. 162/190 |
| 5,470,481 | 11/1995 | Modell et al. . |
| 5,567,278 | 10/1996 | Meinander .................. 162/190 |

OTHER PUBLICATIONS

Jonsson, B.M. "Advanced Water Recycling System Required for New South African Mill", in Trends and Developments in Papermaking edited by John C. W. Evans, Miller and Freeman Publications, Inc., Chapter 15, pp. 60–64.

Guss, Daniel B., "Closed Water Systems in Mills Using Secondary Fiber", TAPPI, vol. 61, No. 6, pp. 19–21.

*Primary Examiner*—Jose Fortuna
*Attorney, Agent, or Firm*—Andrus, Sceales, Starke & Sawall

[57] ABSTRACT

A method of papermaking having zero liquid discharge. A pulp slurry is produced from recycled cellulosic material and the slurry contains suspended cellulosic fiber material, solid contaminants and dissolved water soluble solids. The pulp slurry is subjected to a cleaning operation to produce a first flow stream containing the cellulosic fiber material and dissolved solids and a second flow stream containing dissolved solids along with solid contaminants. The first flow stream is washed with water to remove a substantial portion of the dissolved solids and provide a washed pulp which is used in a papermaking machine to produce a paper sheet. The second flow stream from the cleaning operation is compacted to produce a solid residue that can be landfilled and a liquid residue containing dissolved solids that can be recycled to the pulp cleaning operation. In a modified form of the invention, the liquid residue from the compaction can be subjected to a process, such as evaporation, to provide a solid residue and a purified water or condensate which can be used in the papermaking machine.

10 Claims, 2 Drawing Sheets

METHOD OF PAPERMAKING HAVING ZERO LIQUID DISCHARGE

This application is a continuation-in-part of application Ser. No. 08/654,248, filed May 28, 1996 now U.S. Pat. No. 5,762,758, which in turn is a continuation of application Ser. No. 08/298,748, filed Aug. 31, 1994, now abandoned.

BACKGROUND OF THE INVENTION

Most paper or paperboard operations discharge tremendous quantities of liquid which contain suspended solids, such as wood fibers, clay, calcium carbonate, titanium dioxide, sand, and wood bark, along with oxygen demanding organic compounds, such as starches, lignins, and hemicellulose. In addition, the liquid discharge can also contain trace chemicals, such as chlorinated organic compounds, polychlorinated biphenols, metals such as barium, aluminum, and other trace elements. The adverse environmental impact of this liquid discharge from a papermaking operation is well documented.

There are several reasons for the liquid discharge from a papermaking operation. In some cases, the liquid discharge is due to careless, excessive use of water and, if excess water is used, it must be discharged from the operation. In other cases, the liquid discharge is the result of poor water system design, which results in inadvertent use of fresh water. In still other instances, excess water has been employed in an attempt to keep the suspended and dissolved solid levels at a low enough level to ensure optimum paper machine conditions. In this latter case, the added water effects a reduction in suspended and dissolved solids, but produces a corresponding increase in effluent flow.

Typically the most highly contaminated water discharged from a conventional papermaking operation utilizing recycled waste paper, results from the cleaning of the recycled pulp. The liquid residue from the cleaning operation is normally subjected to floatation clarification, in which the lighter weight solid material is recovered as a floating layer which can be burned or landfilled. The liquid effluent from the clarification process, which contains dissolved solids and oxygen demanding compounds, then must be treated by either an aerobic or anaerobic process before it can be discharged to the sewer system. Evaporation of the liquid effluent has not been feasible due to the tremendous volume of effluent.

SUMMARY OF THE INVENTION

The invention is directed to a papermaking operation having zero liquid discharge. In accordance with the invention, a recycled cellulosic pulp is initially subjected to a cleaning operation. The cleaning operation in itself is conventional, and normally includes a number of stages in which various types of suspended solids or particulate material are removed from the pulp. In a typical cleaning operation, debris and heavy material, such as stones, metal, glass, and the like are initially removed from the pulp by a liquid cyclone, and the pulp is then subjected to a coarse screening, followed by a secondary finer screening to remove large and small size contaminants. Following this, the pulp is subjected to a forward cleaning operation utilizing a liquid cyclone to remove sand, small fiber bundles, ink, and the like. Several stages of forward cleaning are normally employed. The sand, dirt, and other solid material that is removed during the forward cleaning is then subjected to compaction, and the liquid phase from the compaction is discharged to a clarifier.

After the forward cleaning, the pulp is then passed through a slotted screen cleaner, which removes smaller particles of plastics, hot melt, adhesives, and the like. The solid residue from the slotted screen cleaner is again compacted and liquid removed during the compaction is sent to the clarifier.

Following the slotted screen cleaning the pulp is subjected to reverse cleaning utilizing a liquid cyclone, in which lighter material, such as wax, latex, hot melt, is separated from the heavy material, which is the pulp. Again, the reverse cleaning is normally carried out in a number of stages, and the separated light phase is sent to the clarifier.

In the clarifier, which is preferably a floatation clarifier, the solid materials are separated as a floating upper layer or sludge which is combined with the slotted screen and forward cleaner rejects and is discharged to a mechanical solid waste dewatering unit, such as a sludge press. A portion of the liquid effluent from the clarifier or from the sludge press may be sent to an evaporator.

In the evaporator, the liquid effluent from the clarifier or sludge press is heated by a low pressure steam discharged from the dryer section of the papermaking machine. High pressure steam, at a pressure normally about 160 psig, from a steam generating plant is supplied to the dryers in the dryer section of the papermaking machine and a mixture of low pressure steam at a pressure of perhaps 50 psig, and steam condensate, are discharged from the dryers to a condensate tank where the low pressure steam is separated from the condensate. The low pressure steam is then delivered to the evaporator and used as the best source to evaporate the liquid effluent from the clarifier. The condensate from the dryer steam as well as the condensate from the vaporized liquid effluent can be combined and delivered to a water storage tank, or alternately the condensate from the dryer steam, which is relatively pure, can be recycled to the steam generating plant. The evaporated residue from the evaporator is transferred to the solid waste dewatering unit where it is combined with the sludge from the clarifier. The combined residues are dewatered in the sludge press of the dewatering unit to produce a residue containing about 30 to 50% solids, and this material can then either be landfilled or incinerated. The evaporator residue may be concentrated to the point that it is crystallized or alternately the concentration of the dissolved solids is elevated to such a level that the sludge press reaches an equilibrium level where the pressed material carries with it the dissolved solids at the rate at which they are entering the system.

The recycled pulp, after cleaning, is subjected to counter-current washing. Typically, recycled pulp is not washed in a counter-current system. The counter-current washer uses very little wash water and acts to remove the majority of the dissolved solids in the pulp. A properly designed washer with the appropriately segregated water system, will serve as a barrier keeping high levels of ionic materials, such as alum; other soluble materials, such as starches; and colloidal material, such as fiber debris, calcium carbonate and clay, from getting into the paper machine water system.

Following the washing, the pulp undergoes normal stock preparation and can then be utilized in the papermaking process.

The condensed dryer steam and the condensate resulting from the evaporation of the liquid effluent from the clarifier can be combined with fresh makeup water in the water storage tank or chest, and this water is then employed in the papermaking process to be used in portions of the process that require relatively pure water with a minimum mineral content, such as for example, the showers and pump sealing water. Water recovered from the papermaking process is recycled back to the pulp washing operation and used to wash the pulp, and similarly, water recovered from the washing operation, can be recycled back and employed in pulp cleaning and pulping.

With the process of the invention, there is zero liquid discharge from the papermaking operation, the only discharge being solid residue that can be either landfilled or incinerated.

As a further advantage, the process of the invention produces a higher fiber yield, as no small fibers or fines are lost in water discharge.

The process of the invention also requires less energy than conventional papermaking processes. In a conventional process, water at an elevated temperature of approximately of 120° to 160°, is used as the incoming water in the papermaking operation, and the water is normally heated to this temperature either through direct heating or sparging with steam. In the process of the invention, the only required heat source is the heat needed for evaporation of the liquid effluent from the clarifier, and the steam from that evaporation will meet the heat requirements for the incoming water.

Further, the process of the invention saves the energy normally required in the aerobic or anaerobic treatment of the liquid being discharged to the sewer system.

As a further advantage, the process of the invention results in a considerably lesser water consumption than normal papermaking operations. This is an important factor when the papermaking mill is located in an arid region of the country.

In a modified form of the invention, recycled cellulosic pulp slurry from the pulping operation is subjected to a conventional cleaning operation including the removal of heavy contaminants by centrifugal cleaners, followed by coarse and fine screening, forward and reverse cleaning, and the separation of lighter phases through floatation clarification. The cleaning operation produces a first aqueous flow stream which contains dissolved solids and the majority of the cellulosic fiber material and is substantially free of solid contaminants, and a second reject flow stream or sludge that consists of high levels of solid contaminants and dissolved solids.

The cleaned cellulosic pulp in the first flow stream is then subjected to countercurrent washing which serves to remove the majority of the dissolved solids in the pulp slurry. Following the washing, the pulp slurry undergoes normal stock preparation and then is utilized in a papermaking machine to produce a paper sheet.

The second or reject flow stream from the cleaning operation and consisting predominantly of the solid contaminants is subjected to a mechanical dewatering operation to produce a solid cake which then can be discharged to a disposal site, such as a landfill or incinerator. The water effluent from the dewatering operation can be recycled and used in the pulp cleaning operation.

As in the first embodiment, water recovered from the papermaking machine, which can consist of water recovered from the showers and pulp seal water, as well as water extracted from the wet paper web, is then recycled to the pulp washer and used as wash water for washing the pulp. The water recovered from the pulp washing operation, consisting of residual wash water, as well as water recovered by virtue of the increase in consistency of the pulp as it passes through the washing operation, is then recycled to the pulping vessel for use in producing the pulp slurry. A portion of the recirculated water from the washing operation can also be recirculated to the pulp cleaner.

A primary concern in any attempt to develop a zero liquid discharge system, is the progressive buildup of dissolved solids in the recirculated water. However, with the method of the invention a substantial portion of the dissolved solids are carried away in the solid sludges or residue which can be landfilled or incinerated, thus preventing an undesirable buildup of dissolved solids in the recirculated water.

The modified form of the invention does not require additional operations, such as evaporation, reverse osmosis or ultrafiltration, to remove dissolved solids from the water stream, but these additional operations can enhance the overall system by providing more purified water for the papermaking operation, thereby increasing the available water for washing.

Other objects and advantages will appear in the course of the following description.

DESCRIPTION OF THE DRAWINGS

The drawing illustrates the best mode presently contemplated of carrying out the invention.

In the drawings.

DESCRIPTION OF THE ILLUSTRATES EMBODIMENT

Figure 1:
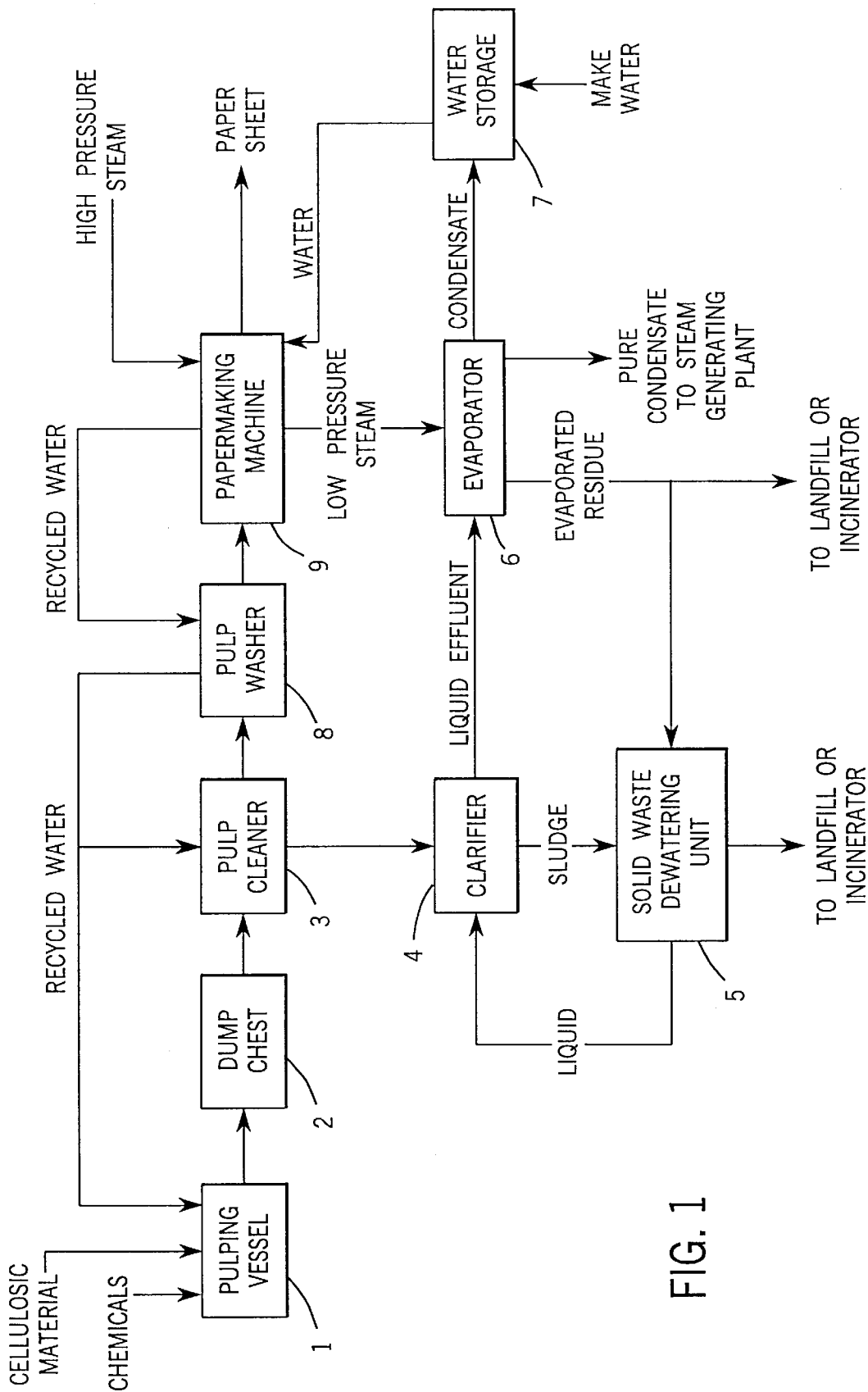
FIG. 1 is a flow diagram illustrating the process of the invention.

FIG. 1 is a flow diagram illustrating the papermaking process of the invention having zero liquid discharge. A recycled pulp slurry is initially produced in a pulping vessel 1 using conventional techniques. The recycled material can include used corrugated containers, wastepaper, white office waste, or the like, and can contain debris and solid contaminates and also include a substantial quantity of fillers, such as clay and calcium carbonate, as well as ink, which normally would not be present in a virgin pulp.

In the pulping operation, a caustic material such as sodium hydroxide, is added to the pulp, along with water, and conventional surfactants to wet the fibers. Sodium silicate can be used as a deinking aid and hydrogen peroxide as a brightener.

In the pulping vessel 1, the pulp is maintained at a temperature generally in the range of 120° F. to 160° F., and is subjected to agitation or a shearing action to break down the fiber bundles.

The pulping can either be a continuous operation, in which materials are continuously fed and discharged from the pulper, or a batch pulping operation. With a batch operation the pulp is maintained in the pulper at the above-noted temperature and with agitation for a period generally in the range of 15 to 35 minutes.

The consistency of the pulp in the pulping operation can vary depending upon the type of paper being produced. When producing corrugated medium for use in corrugated cartons, the pulp may be at a consistency in the range of 3% to 5% by weight of solids. On the other hand, when producing more sophisticated grades of paper, such white office paper, the pulp may have a consistency of 10% to 15% by weight of solids.

After pulping, the pulp is discharged to a pulp chest 2. With a batch-type pulping operation, the pulp chest serves as a storage facility for the pulp, and the pulp is then discharged continuously from the pulp chest through the remainder of the papermaking process. When a continuous pulping process is employed, the pulp chest will serve to compensate for variations in flow from the pulper 1 and provide a consistent flow throughout the papermaking process.

The pulp is then pumped from the dump chest 2 to a pulp cleaner 3, which acts to remove suspended solids and particulate material from the pulp. The cleaning operation is, in itself, conventional and consists of a series of sequential cleaning procedures. More particularly, large and heavy debris, such as bark, stones, glass, metal pieces, and the like, are initially removed from the pulp slurry, preferably by a liquid cyclone. The pulp then undergoes a coarse screening operation to remove larger-sized contaminants. Following the coarse screening, the pulp is subjected to a finer secondary screening, in which the pulp is subjected to a shearing action, and smaller sized solids or contaminants are removed.

After the secondary screening, the pulp slurry then undergoes a forward cleaning to remove small particles of sand, fiber bundles, ink, and the like. At this stage the pulp generally has a consistency of about 1.5% solids, and a liquid cyclone is employed for the forward cleaning, with several stages being utilized. The solid particulate material removed from the pulp during the forward cleaning is then transferred to a compactor and the liquid resulting from the compaction process is discharged to a clarifier 4.

Following the forward cleaning the pulp slurry is passed through a slotted screen cleaner which acts to remove plastics, hot melt adhesives, and the like from the slurry. The residue from this cleaning operation is compacted and the liquid recovered from the compaction operation again is transferred to the clarifier 4.

At this stage the pulp may still contains small quantities of wax, latex, hot melt adhesives, and the like, and the pulp is then subjected to a reverse cleaning operation in a liquid cyclone. In this operation, the lighter weight materials, such as wax, latex, and the like, are removed from the heavier pulp, and again the reverse cleaning can be carried out in a plurality of stages. The lighter phase, which is removed during the reverse cleaning, is also transferred to the clarifier 4.

The clarifier, in itself, is a conventional type and is preferably a floatation clarifier. The upper floating portion of the material in the clarifier is in the form of a sludge and has a solids content in the range of about 1.5% to 2.5%. The sludge is conveyed to a solid waste dewatering mechanism 5, while the liquid effluent from the clarifier 4 is transferred to an evaporator 6.

In a typical papermaking process, steam from a steam generating plant is supplied to the dryers in the dryer section of the papermaking machine. The typical papermaking machine may contain approximately twenty to one hundred dryers and the paper web supported by a dryer fabric is passed over the dryers to dry the paper. It is customary to use a cascading steam system in the dryer section of the papermaking machine, in which high pressure steam at a pressure of about 160 psig, is supplied to a first group of dryers and lower pressure steam discharged from the first group of dryers is supplied to a second group, of dryers. This cascading system is continued, so that low pressure steam at perhaps a pressure of 50 psig, along with steam condensate, is discharged from a last group of dryers in the section and either condensed and returned to the steam generating plant, or discharged to the atmosphere.

In accordance with a feature of the invention, low pressure steam discharged from the dryer section of the papermaking machine 9 is utilized as the power source to evaporate the liquid effluent from the clarifier. In this regard, the steam, at a pressure of perhaps 50 psig, and condensate from the dryers is discharged to a condensate tank where the steam is separated from the condensate. The condensate can then be employed as a heat source to heat incoming process water to the papermaking machine. The low pressure steam from the condensate tank, at perhaps a pressure of 45 psig, is supplied to evaporator 6 to evaporate the liquid effluent. The evaporation is preferably carried out by a multiple effect evaporator, such as that sold by Goslin-Birmingham of Birmingham, Ala. The low pressure steam from the dryer section is utilized to heat the liquid effluent to produce water vapor and organic vapors, due to the fact that the effluent may contain small amounts of volatile organic constituents. The vapor resulting from the evaporation of the liquid effluent is then condensed and transferred to a water storage tank 7. The condensed dryer steam from evaporator 6 can be combined with the condensate from the vaporized liquid effluent in tank 7, or alternately, as the condensate from the dryer steam is relatively pure, it can be recycled to the steam generating plant, as shown in the flow diagram.

While a typical papermaking operation utilizes a cascading steam system in the dryer section, a non-cascading system is preferred in the invention, with high pressure steam being supplied to all of the dryers in the dryer section. The reason this is preferred is that all dryers may be maintained at maximum pressure, which maximizes the drying rate and therefore minimizes the investment in drying equipment. A non-cascading system is economically feasible with the process of the invention because the steam being discharged from the dryer section is supplied to the evaporator 6 and used as a heat source for the evaporation of the liquid effluent from the clarifier.

The evaporated residue of crystals, if an evaporation is employed, may have a solids content of 40% to 60% by weight. It is possible, and preferable, to not concentrate the residue to these high levels, since this may result in evaporator fouling. It is only necessary to evaporate a portion of the contaminated water in the processing loop, upstream or ahead of the pulp washer, so as to supply the necessary quantity of condensate critical end uses, such as pump seals, etc. The solids content in the water system upstream of the pulp washing will rise to an equilibrium at which point the removals with the sludge will be equal to the rate of addition with the wastepaper.

In the dewatering unit 5, the solid waste is dewatered by mechanical equipment, such as a compactor, screw press, or belt press and the small amount of liquid removed from the solid waste can be returned to the clarifier. The dewatered sludge having a consistency generally in the range of about 35% to 50% by weight solids, can then either be landfilled or incinerated. With proper design of the dewatering unit 5, the colloidal material will be entrapped by the filter cake and the ionic solution in the filter cake increases as the lower ionic solution is displaced. The incineration of the dewatered residue can be accomplished either in a coal or oil fired boiler. The dewatered residue is high in fuel value and also contains sulfur capturing sodium hydroxide and calcium carbonate. Applying the residue to coal as a dust control has a positive impact on sulfur dioxide emissions from the furnace or boiler.

The dewatered residue can also be used for dust control of fly ash. Fly ash from coal burning operations is normally acidic, since the coal will contain high levels of sulfur. By utilizing the residue for dust control, the pH can be maintained closer to neutral.

As shown in the flow diagram the pulp slurry after the cleaning operation and having a solids content of about 0.4% to 2.0% by weight of solids, is pumped to pulp washer 8, in which the dissolved solids contained in the fiber supply, or generated through the pulping operation, are washed from the pulp. When dealing with recycled pulp, the washing operation can also remove dirt, fillers, or suspended solids, such as clay and calcium carbonate. The pulp washing can be carried out by a method as disclosed in U.S. Pat. No. 5,599,426, which is incorporated herein by reference. As disclosed in that patent application, a very thin mat of pulp is supported between a pair of porous endless belts and passed in a sinuous path over a series of rolls. Wash water is impinged against opposite faces of the mat and the tension in the belts as they pass over the rolls creates a dewatering action, so that the pulp is alternately showered with water and then dewatered by the belt tension, thereby removing fillers and dissolved solids from the pulp mat.

With the use of pulp produced from recycled material which contains ink, deinking and ink removal operations are required. The deinking can be accomplished by pulping the recycled material with dispersant chemicals, such as a surfactant, that act to dissociate the ink from the fibers and disperse the ink particles in the aqueous pulp. During the pulping operation, depending upon the nature of the ink, sodium silicate can also be incorporated with the surfactant during the pulping. The sodium silicate provides alkalinity and aids in releasing and dispersing the ink particles. In addition, hydrogen peroxide and chelating agents can be utilized during pulping, which aid in solubilizing certain oils in the ink, act as a brightening agent, and permit highly alkaline operations without color reversion. Through this treatment during pulping, the ink is dissociated from the cellulosic fibers.

Following the washing operation, the recycled pulp can then be subjected to an ink removal operation. Ink removal can be achieved either by froth floatation or dilution washing, which can include a side hill screen washer, a gravity decker, a vacuum filter, an inclined screw extractor, or other types of washing. The publication *"Beloit Corporation Deinking Manual"* 2nd Ed., 1979, describes conventional ink removal processes.

After deinking the recycled pulp may have a dingy color due to a small portion of residual ink, and thus the pulp is normally subjected to bleaching. In the bleaching operation, the pulp is thickened to a consistency of about 15% solids, and bleached by adding a material, such as hydrogen peroxide, ozone, or oxygen. The pulp is thickened in order to reduce the amount of bleaching chemicals that are required.

The pulp then undergoes stock preparation, which normally consists of refining and dilution to provide the pulp in the headbox of the papermaking machine 9, with a consistency of about 0.2% to 1.2% by weight solids.

In the papermaking process, the pulp as a thin web or layer is conveyed through the forming, press and dryer sections of the papermaking machine 9 in a conventional manner to form the paper sheet.

In the papermaking operation, relatively pure water, having a minimum mineral content is required for certain equipment, such as the showers, and vacuum pump sealing water. In accordance with the invention, the condensate from storage tank 7 is used in the papermaking operation, as shown in the flow diagram. Depending on the water balance, make-up can also be added to storage tank 7. The makeup water would normally be municipal water, and if the makeup water has a high mineral content, the makeup water can be added to the liquid effluent flowing between the clarifier 4 and the evaporator 6, so that the makeup water is then subjected to the evaporation process.

Water recovered from the papermaking operation, which can consist of water recovered from the showers and pump seal water, as well as water extracted from the wet paper web, is then recycled to the pulp washer 8 and used as the wash water for washing the pulp. The water recovered from the pulp washing operation, which consists of residual wash water, as well as water recovered by virtue of the increase in consistency of the pulp as it passes through the washing process, is then recycled to the pulper 1 for use in producing the pulp slurry. In addition, a portion of the recirculated water as shown in the flow diagram, can be recycled to the pulp cleaner 2.

The invention maintains two distinct water systems. One water system is maintained upstream or preceding the pulp washer 8 and includes the pulping vessel 1, pulp cleaner 3, clarifier 4, and dewatering unit 5. This water system contains a relatively high level of dissolved solids. The second water system located downstream of the pulp washer 8 is low in dissolved solids. The wash water supplied to the counter-current pulp washer 8 is excess papermaking water and the water recovered from the pulp washing is utilized as make-up water in the pulping vessel.

In the pulp washer 8, the recycled pulp is subjected to counter-current washing. Normally recycled pulp is not washed in a counter-current system. However, the counter-current washing acts to remove the majority of the dissolved solids in the pulp through use of a relatively small volume of water, thus preventing the dissolved solids, as well as colloidal material, from entering the paper machine water system, thus maintaining a proper balance between the pulping water system and the paper machine water system, so that there is no contaminated water discharge from the overall system.

The process of the invention provides a papermaking operation which has zero water discharge and the solids discharged from the process have a consistency such that they can be either landfilled or incinerated.

The process also provides a higher fiber yield, and as there is no fiber loss in a water discharge as in conventional processes. In many conventional papermaking operations, a substantial portion of the small fibers or fines are lost in the liquid discharge of the operation.

As a further advantage, low pressure steam discharged from the dryer section of the papermaking machine is utilized as the heat source to evaporate the liquid effluent from the clarifier, and the condensate from the evaporation process serves as a heat source for the incoming water to the papermaking machine. Thus, it is not necessary to directly heat the incoming water as is required in a conventional papermaking operation.

The process of the invention also enables brackish water having a high mineral content to be employed as make-up water by introducing the makeup water ahead of the evaporator, so that the makeup water is also vaporized.

As the process has zero liquid discharge, the process utilizes substantially smaller quantities of water than a conventional papermaking operation, and this has distinct advantages in arid regions of the country where water is at a premium.

Figure 2:
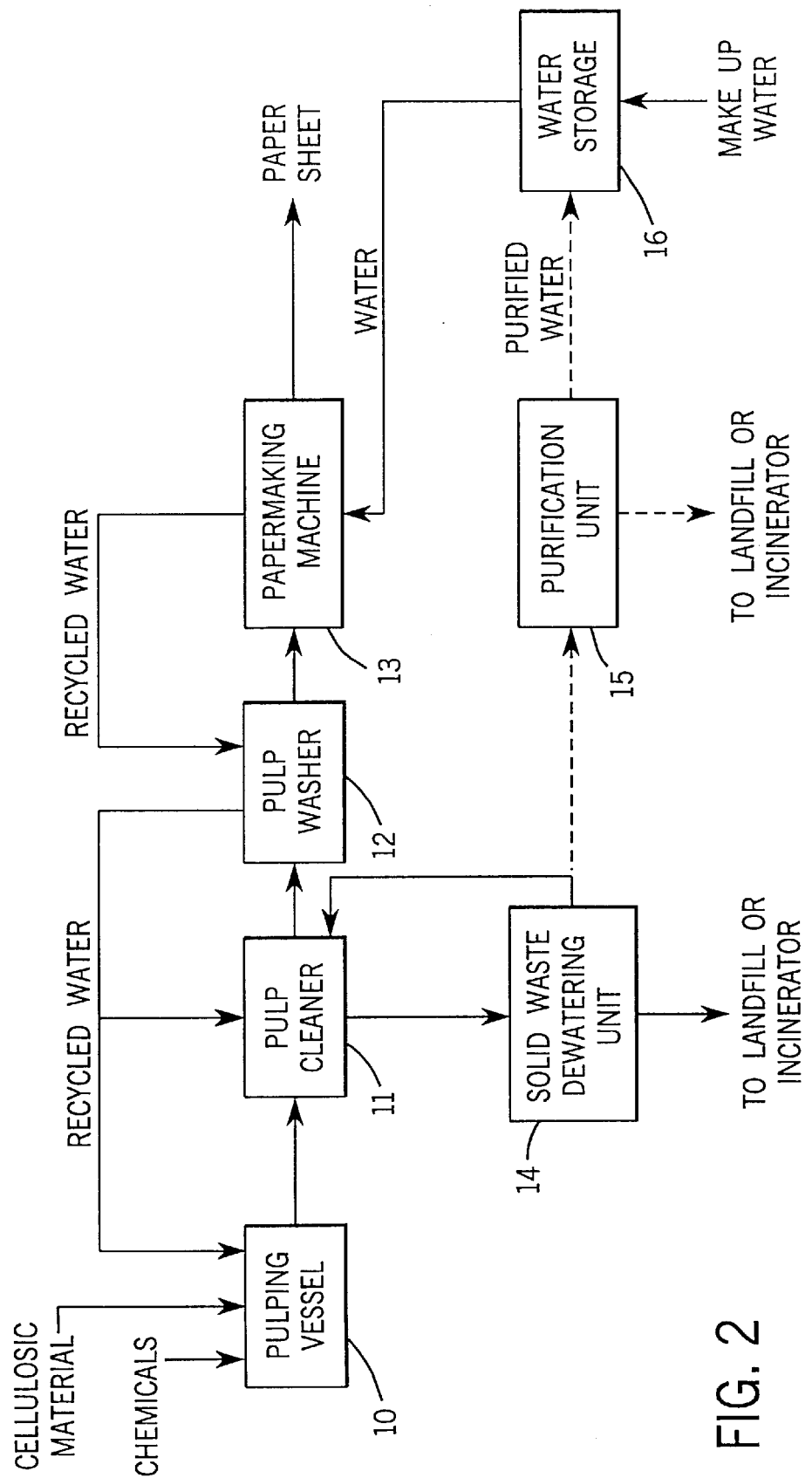
FIG. 2 is a flow diagram illustrating a modified form of the invention.

FIG. 2 illustrates a modified form of the invention. As in the first embodiment, a recycled cellulosic pulp slurry is initially produced in a pulping vessel 10 using conventional techniques. As previously described, the recycled cellulosic material can include used corrugated containers, waste paper, white office waste, or the like, and normally contains debris and solid contaminants. The recycled material also may include a substantial quantity of water insoluble fillers, such as clay and calcium carbonate, as well as ink. In addition, the recycled cellulose may also contain residual water soluble materials emanating from the original pulping or papermaking operation, such as sodium salts of lignin, alum, starch and the like. In the pulping operation, pulping chemicals, such as sodium hydroxide, are added to the pulp along with water and conventional surfactants. Sodium silicate can also be used as a deinking aid and hydrogen peroxide as a brightener. During the pulping, the pulp is maintained at a temperature generally in the range of 120° F. to 160° F. and is subject to agitation or shearing to break down the fiber bundles.

As described with respect to the first embodiment, the pulp slurry, having a consistency generally in the range of 2% to 5% by weight of solids, is discharged from the pulping vessel to a pulp chest, not shown, and is then pumped from the pulp chest to a pulp cleaner 11. In the pulp cleaner, the pulp slurry is subjected to a conventional cleaning procedure to remove suspended solids and particulate material from the pulp. As described with respect to the first embodiment, large and heavy debris is initially removed from the pulp slurry by centrifugal cleaning as, for example, by using a liquid cyclone. The pulp then undergoes a coarse screening to remove larger sized contaminants, followed by a finer secondary screening to remove smaller solids or contaminants.

As previously described, after the secondary screening, the pulp slurry then undergoes several stages of forward cleaning forward followed by several stages of reverse cleaning. Following the reverse cleaning, the pulp slurry can be subjected to a conventional floatation clarification to remove lighter weight contaminants.

Thus, the cleaning operation, after removal of the heavy debris, produces two aqueous flow streams, the first flow stream consisting primarily of suspended cellulosic fibers that are substantially free of solid contaminants, along with water soluble dissolved solids. In practice, this pulp flow stream which is pumped to the pulp washer 12 has a consistency generally in the range of about 0.5% to 3.0% solids.

The second or reject flow stream being discharged from the cleaning operation consists of rejects from the coarse and fine screening, rejects from the forward and reverse cleaning operations, as well as rejects from the floatation clarification. Thus, this reject stream consists primarily of suspended solids contaminants, along with dissolved solids. In practice, the reject stream may have a consistency in the range of 2.0% to 2.5% solids.

The cleaned pulp stream from the pulp cleaner 11 is pulped to the pulp washer 12, wherein the pulp is washed to remove dissolved solids that originated from the recycled fibrous supply, or generated through the pulping operation. As described in the prior embodiment, the washing operation can also remove residual dirt, fillers, or suspended solids, such as clay and calcium carbonate, when dealing with recycled pulp. The washing is preferably a countercurrent type and the washing can be carried out by a method as disclosed in U.S. Pat. No. 5,599,426, which is incorporated herein by reference. As previously described, the washed, recycled pulp can then be subjected to an ink removal operation, and then bleached, if desired, by a bleaching agent, such as hydrogen peroxide, ozone, or oxygen. The pulp then undergoes stock preparation consisting of refining and dilution to provide the pulp in the head box of the papermaking machine 13 with a consistency of about 0.2% to 1.2% by weight solids.

In the papermaking process, the pulp as a thin web or layer is conveyed through the forming, press and dryer sections of the papermaking machine in a conventional manner to form the paper sheet.

Makeup water, which normally would be municipal water, is supplied to the papermaking machine 13, for use as showers, pump seal water, and the like.

Water recovered from the papermaking operation, which can consist of water removed from the showers and pump seal water, as well as water extracted from the wet paper web, is then recirculated to the pulp washer 12 and used as the wash water for washing the pulp. As shown in FIG. 2, the water recovered from the pulp washing operation, as well as water recovered by virtue of the increase in consistency of the pulp as it passes through the washing process, is then recycled to the pulping vessel 10 for use in producing the pulp slurry. A portion of the recirculated water, as shown in FIG. 2, can also be recycled to the pulp cleaner 11.

The reject flow stream being discharged from the pulp cleaner 11 normally has a solids content of about 2.0 to 2.5% by weight solids, and is delivered to a dewatering unit 14 where the material is dewatered, preferably by mechanical equipment, such as a compactor, screw press, or belt press. The resulting dewatered sludge, which includes the solid contaminants as well as a portion of the dissolved solids. has a consistency generally of about 35% to 50% by weight solids and can either be land filled or incinerated. The water extracted during the dewatering operation, which also contains dissolved solids, can be recycled to the pulp cleaner 11, as shown in FIG. 2.

One of the primary concerns in a zero liquid discharge papermaking operation is the gradual buildup of dissolved solids in the water phase. A buildup of dissolved solids can adversely affect the physical properties of the paper being produced. With the system of the invention, a substantial portion of the dissolved solids are removed in the cake or sludge produced by the dewatering unit, so that a control is provided for the buildup of dissolved solids in the water phase.

With the method of the invention, as shown in FIG. 2, additional treating operations, such as evaporation, reverse osmosis or ultrafiltration to remove dissolved solids from the water phase are not required. However, the overall papermaking operation can be enhanced, if desired, by subjecting a portion of the water effluent from the dewatering unit 14 to a purification unit 15, as shown by the dashed lines in FIG. 2. The purification unit 15 serves to remove dissolved solids from the effluent and can constitute an evaporation, reverse osmosis or ultrafiltration system. The purified water from unit 15, which in the case of an evaporation system would be condensate, is delivered to a water storage unit 16 where it is combined with make-up water and fed as needed to the papermaking machine. The solid residue from unit 15 can be landfilled or incinerated, as shown in FIG. 2. By utilizing the water purification unit 15, additional purified water is made available for the papermaking operation and this, in turn, increases the available water for washing If the make-up water is of low quality, i.e. has a high mineral content, the low quality water can be supplied to the purification unit 15, along with the liquid effluent from the dewatering unit 14, rather than being supplied to the water storage unit 16, as shown in FIG. 2. The purified water from purification unit 15 is then delivered through water storage unit 16 to papermaking machine 13.

I claim:

1. A method of papermaking have zero liquid discharge, comprising the steps of pulping recycled waste paper and recycled water from a papermaking operation with pulping chemicals to form a pulp slurry, said recycled water containing dissolved water soluble solids and said waste paper containing cellulosic fiber material, solid contaminants, and water soluble solids, subjecting the pulp slurry to a cleaning operation to produce a first flow stream containing said cellulosic fiber material and dissolved solids and being substantially free of said solid contaminants and a second flow stream consisting primarily of suspended solid contaminants and dissolved solids, washing said first flow stream with water to remove residual dissolved solids from said first flow stream and provide a washed pulp, utilizing the washed pulp in a papermaking machine to provide a paper sheet, supplying water to the papermaking machine, recovering water from the papermaking machine and utilizing the recovered water in the pulp washing operation, recovering water containing dissolved solids from the pulp washing operation and utilizing the recovered water in the pulping operation, removing water from the second flow stream to produce a solid residue and a liquid residue containing dissolved solids, and utilizing the liquid residue in the pulp cleaning operation.

2. The method of claim 1, and including the step of utilizing water containing dissolved solids recovered from the pulp washing operation in the pulp cleaning operation.

3. The method of claim 1, and including the step of removing water from the second flow stream by mechanical operation.

4. The method of claim 1, and including the step of discharging the solid residue to a landfill operation.

5. The method of claim 1, and including the step of subjecting the liquid residue to a purification treatment to produce a substantially pure water phase and residual material, and incorporating the substantially pure water phase in the papermaking operation.

6. The method of claim 5, and including the step of incorporating low quality make-up water with said liquid residue in the purification treatment to produce the substantially pure water phase.

7. The method of claim 5, wherein the purification treatment is evaporation.

8. The method of claim 5, wherein the purification treatment is reverse osmosis.

9. The method of claim 5, wherein the purification treatment is ultrafiltration.

10. A method of papermaking having zero liquid discharge, comprising the steps of pulping recycled cellulosic fiber material with water and pulping chemicals to form a pulp slurry, said cellulosic fiber material containing solid contaminants, subjecting the pulp slurry to a cleaning operation to provide a first flow stream containing a cleaned pulp and dissolved solids and being substantially free of said solid contaminants and a second flow stream containing suspended solid contaminants and dissolved solids, washing said first flow stream with water to remove residual dissolved solids from said first flow stream and provide a washed pulp, utilizing the washed pulp in a papermaking machine to provide a paper sheet, supplying water to the papermaking machine, recovering water from the papermaking machine and utilizing the recovered water in the pulping operation, removing water from the second flow stream to produce a compacted residue containing said solid contaminants and dissolved solids and a liquid residue containing dissolved solids, and utilizing the liquid residue in the pulp cleaning operation.

* * * * *